US012365124B2

(12) United States Patent
Otsuki et al.

(10) Patent No.: US 12,365,124 B2
(45) Date of Patent: Jul. 22, 2025

(54) INJECTION MOLDING MACHINE MANAGEMENT SYSTEM AND NON-TRANSITORY COMPUTER-READABLE STORAGE MEDIUM STORING COMPUTER PROGRAM

(71) Applicant: Seiko Epson Corporation, Tokyo (JP)

(72) Inventors: Yoshiaki Otsuki, Matsumoto (JP); Ko Tsukada, Matsumoto (JP); Yusuke Mitsuma, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 493 days.

(21) Appl. No.: 17/527,279

(22) Filed: Nov. 16, 2021

(65) Prior Publication Data

US 2022/0152902 A1 May 19, 2022

(30) Foreign Application Priority Data

Nov. 17, 2020 (JP) .................. 2020-190983

(51) Int. Cl.
*B29C 45/76* (2006.01)
*G05B 19/4155* (2006.01)

(52) U.S. Cl.
CPC .......... *B29C 45/76* (2013.01); *G05B 19/4155* (2013.01); *B29C 2045/7606* (2013.01);
(Continued)

(58) Field of Classification Search
CPC .......... B29C 45/76; B29C 2945/76939; B29C 2045/7606; G05B 19/4155; G05B 2219/45244
See application file for complete search history.

(56) References Cited

U.S. PATENT DOCUMENTS 7,117,050 B2 10/2006 Sasaki et al.
7,346,425 B2 * 3/2008 Nishizawa .............. B29C 45/76
700/200
(Continued)

FOREIGN PATENT DOCUMENTS

JP 2001-293761 A 10/2001
JP 2002-361702 A 12/2002
(Continued)

OTHER PUBLICATIONS

Hiroyuki, display program, display method, and display device, 2019, PatentScope, note this is a translation of WO2019092778 (Year: 2019).*

*Primary Examiner* — Darrin D Dunn
*Assistant Examiner* — Yvonne Trang Follansbee
(74) *Attorney, Agent, or Firm* — Harness, Dickey & Pierce, P.L.C.

(57) ABSTRACT

An injection molding machine management system includes: a measurement data storage unit that chronologically stores measurement data representing a measurement value measured by an injection molding machine; a manufacturing data storage unit that chronologically stores manufacturing data representing information on manufacturing of a molded product by the injection molding machine; and a control unit that displays on a display unit a statistical diagram of the measurement data on a predetermined period basis and the manufacturing data in the period of the statistical diagram in association with the statistical diagram.

7 Claims, 3 Drawing Sheets

(52) U.S. Cl.
CPC .............. *B29C 2945/76939* (2013.01); *G05B 2219/45244* (2013.01)

(56) References Cited

U.S. PATENT DOCUMENTS

| | | |
|---|---|---|
| 2004/0148136 A1 | 7/2004 | Sasaki et al. |
| 2008/0095982 A1* | 4/2008 | Ae ..................... B29C 45/56 264/328.11 |
| 2020/0368953 A1* | 11/2020 | Komiya ................ B29C 45/768 |
| 2021/0107194 A1* | 4/2021 | Kusakabe ........... B29C 45/7653 |

FOREIGN PATENT DOCUMENTS

| | | | |
|---|---|---|---|
| JP | 2004-164027 A | 6/2004 | |
| JP | 2004-198148 A | 7/2004 | |
| WO | 2014-006807 A1 | 1/2014 | |
| WO | 2019-038843 A1 | 2/2019 | |
| WO | WO-2019092778 A1 * | 5/2019 | ............. G06T 11/20 |

* cited by examiner

INJECTION MOLDING MACHINE MANAGEMENT SYSTEM AND NON-TRANSITORY COMPUTER-READABLE STORAGE MEDIUM STORING COMPUTER PROGRAM

The present application is based on, and claims priority from JP Application Serial Number 2020-190983, filed Nov. 17, 2020, the disclosure of which is hereby incorporated by reference herein in its entirety.

BACKGROUND

1. Technical Field

The present disclosure relates to an injection molding machine management system and a non-transitory computer-readable storage medium storing a computer program.

2. Related Art

JP-A-2001-293761 discloses a device that displays, on the same screen, a line graph representing a production achievement rate of a molded product by an injection molding machine, a band graph representing whether there is a change in molding conditions, and a line graph representing data acquired from a sensor of the injection molding machine. In this device, each graph is displayed with a common time axis as a horizontal axis.

In an injection molding machine, a molded product may be molded at a frequency of several shots per minute, and therefore, for example, when a graph for one day is displayed using the device of JP-A-2001-293761, a line graph in which a measurement value by a sensor is plotted for several thousand shots may be displayed. When the fluctuation of the measurement value is large, it is difficult to analyze a correlation between measurement data and other data even when the line graph of the measurement value is displayed.

SUMMARY

According to a first aspect of the present disclosure, an injection molding machine management system is provided. The injection molding machine management system includes: a measurement data storage unit that chronologically stores measurement data representing a measurement value measured by an injection molding machine; a manufacturing data storage unit that chronologically stores manufacturing data representing information on manufacturing of a molded product by the injection molding machine; and a control unit that displays on a display unit a statistical diagram of the measurement data on a predetermined period basis and the manufacturing data in the period of the statistical diagram in association with the statistical diagram.

According to a second aspect of the present disclosure, a non-transitory computer-readable storage medium storing a computer program is provided. The computer program causes a computer to: chronologically store, on a storage unit, measurement data representing a measurement value measured by an injection molding machine; chronologically store, on a storage unit, manufacturing data representing information on manufacturing of a molded product by the injection molding machine; and display, on a display unit, a statistical diagram of the measurement data on a predetermined period basis and the manufacturing data in the period of the statistical diagram in association with the statistical diagram.

DESCRIPTION OF EXEMPLARY EMBODIMENTS

A. First Embodiment

Figure 1:
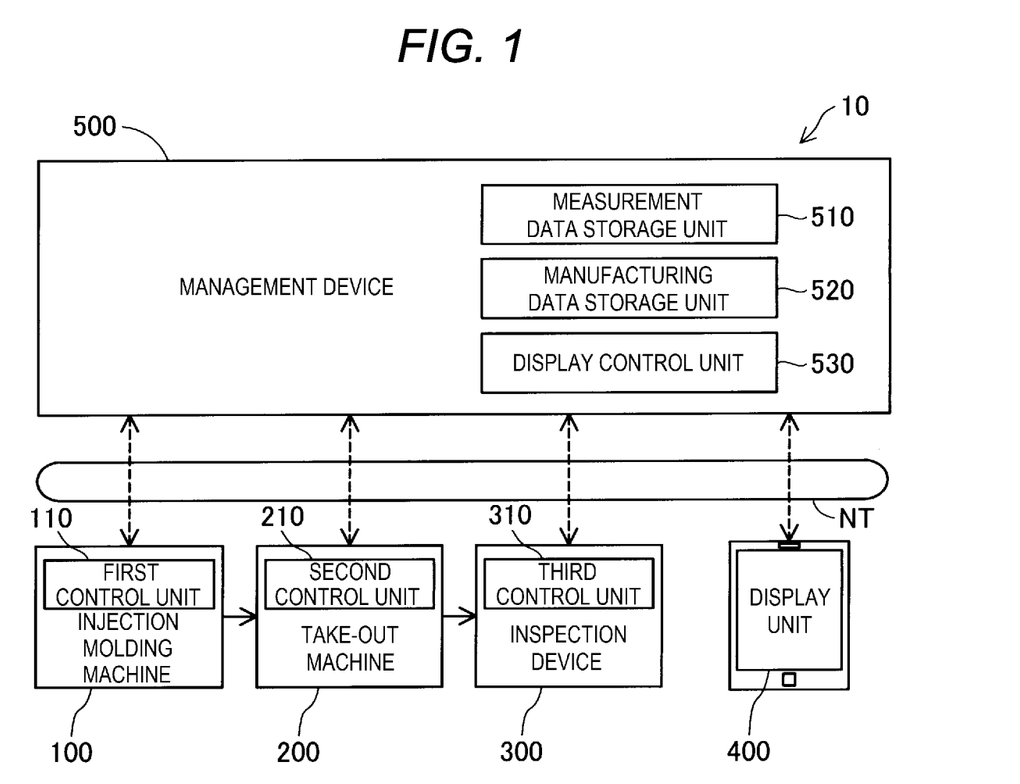
FIG. 1 is a diagram showing a schematic configuration of an injection molding machine management system.

FIG. 1 is a diagram showing a schematic configuration of an injection molding machine management system 10 according to a first embodiment. The injection molding machine management system 10 includes an injection molding machine 100, a take-out machine 200, an inspection device 300, a display unit 400, and a management device 500.

In FIG. 1, a flow of a molded product manufactured by the injection molding machine management system 10 is indicated by a solid line arrow. In the injection molding machine management system 10, a molded product is molded by the injection molding machine 100, the molded product is taken out from the injection molding machine 100 by the take-out machine 200 and conveyed to the inspection device 300, and the molded product is inspected by the inspection device 300.

The injection molding machine 100 includes a first control unit 110, and an injection device and a mold clamping device (neither is shown). A molding die having a cavity is installed to the mold clamping device. The molding die may be made of metal, ceramic, or resin. The molding die made of metal is referred to as a metal mold. The first control unit 110 is configured with a computer including one or a plurality of processors, a main storage device, and an input and output interface that inputs and outputs a signal to and from the outside. The first control unit 110 may be configured with a plurality of computers. A second control unit 210 of the take-out machine 200 and a third control unit 310 of the inspection device 300, which will be described later, have the same configuration as the first control unit 110.

The first control unit 110 controls each unit of the injection molding machine 100 to perform injection molding and mold a molded product. More specifically, the first control unit 110 controls the mold clamping device to clamp the molding die, and controls the injection device to plasticize a material and inject the plasticized material into the molding die, thereby molding a molded product having a shape corresponding to a shape of the cavity provided in the molding die. In the present embodiment, the number of cavities provided in the molding die is one. That is, one molded product is molded by one injection molding. One injection molding is referred to as one shot.

The first control unit 110 generates molding machine data and transmits the molding machine data to the management device 500. The molding machine data includes measurement data and manufacturing condition data. In the measurement data, information on measurement values acquired by various sensors provided in the injection molding machine 100 and measurement time points are shown. In the manufacturing condition data, information on content of manufacturing conditions and a change history of the manufacturing conditions are shown. In the present embodiment, the manufacturing conditions include a molding condition input to the injection molding machine 100, a material of the molded product, a person in charge of operation of the injection molding machine 100, an operation status of the injection molding machine 100, and a maintenance status of the molding die installed to the injection molding machine 100. The change history of the manufacturing conditions indicates a change content of the manufacturing conditions and a change time point.

The take-out machine 200 of the present embodiment includes the second control unit 210, a take-out robot, and a cutting machine. The second control unit 210 controls operations of the take-out robot and the cutting machine. The take-out robot is, for example, a horizontal multi-joint robot or a vertical multi-joint robot. The take-out robot takes out the molded product from the molding die of the injection molding machine 100. The cutting machine is a device that removes a sprue or a runner, which is molded together with the molded product by the molding die, from the molded product by cutting. In the present embodiment, the take-out robot directly grips and takes out the molded product by an end effector attached to a tip of an arm of the take-out robot. The molded product is released from the molding die by an ejector pin of the injection molding machine 100. Thereafter, the sprue and the runner are removed from the molded product by the cutting machine, and the molded product from which the sprue and the runner are removed is conveyed to the inspection device 300 by the take-out robot. In another embodiment, the take-out robot may be, for example, a robot that grips a molded product by vacuum suction. The take-out machine 200 may not include a cutting machine.

The inspection device 300 of the present embodiment includes the third control unit 310 and a camera. The third control unit 310 controls the camera to capture an image of the molded product, and performs appearance inspection and dimension inspection of the molded product by analyzing the captured image of the molded product.

The third control unit 310 generates inspection device data and transmits the inspection device data to the management device 500. The inspection device data includes inspection result data and inspection condition data. In the inspection result data, content of an inspection result and an inspection time are shown. The inspection result shows information about whether the inspected molded product is a conforming product that satisfies a predetermined quality standard or a nonconforming product that does not satisfy the quality standard. A molded product that satisfies a quality standard related to an appearance and a quality standard related to a dimension of the molded product is a conforming product, and a molded product that does not satisfy at least one of the quality standard related to the appearance and the quality standard related to the dimension is a nonconforming product. A situation in which the quality standard related to the appearance is not satisfied is referred to as appearance nonconformance, and a situation in which the quality standard related to the dimension is not satisfied is referred to as dimension nonconformance. In the present embodiment, the inspection result data shows information about whether the inspected molded product is a nonconforming product due to the appearance nonconformance or a nonconforming product due to the dimension nonconformance. In the inspection condition data, content of inspection conditions and information on a change history of the inspection conditions are shown. In the present embodiment, the inspection conditions include a person in charge of operation of the inspection device. In the change history of the inspection conditions, a change content of the inspection conditions and a change time point are represented.

In the present embodiment, the display unit 400 is a liquid crystal display provided in a mobile terminal carried by an operator. The mobile terminal refers to, for example, a tablet terminal, a small notebook computer, or a smartphone. The display unit 400 may be, for example, a display coupled to the management device 500 or a large display installed in a factory, instead of the display provided in the mobile terminal.

The management device 500 is configured with a computer including one or a plurality of processors, a main storage device, an auxiliary storage device, and an input and output interface that inputs and outputs a signal to and from the outside. The management device 500 may be configured with a plurality of computers.

The management device 500 is communicably coupled to the injection molding machine 100, the inspection device 300, and a mobile terminal provided with the display unit 400. In the present embodiment, the management device 500 is communicable with, via a network NT, the injection molding machine 100, the inspection device 300, and the mobile terminal provided with the display unit 400. The network NT may be, for example, a LAN, a WAN, or the Internet. The management device 500 communicates with the injection molding machine 100, the take-out machine 200, and the inspection device 300 via the network NT to transmit and receive data to and from the injection molding machine 100, the take-out machine 200, and the inspection device 300.

The management device 500 includes a measurement data storage unit 510, a manufacturing data storage unit 520, and a display control unit 530. The measurement data storage unit 510 and the manufacturing data storage unit 520 are provided on the auxiliary storage device of the management device 500. The display control unit 530 is implemented as software by the processor of the management device 500 executing an injection molding management program. The display control unit 530 may be simply referred to as a control unit.

The measurement data storage unit 510 chronologically stores the measurement data acquired from the injection molding machine 100. The manufacturing data storage unit 520 chronologically stores the manufacturing condition data acquired from the injection molding machine 100, and the inspection condition data and the inspection result data acquired from the inspection device 300. The manufacturing condition data, the inspection condition data, and the inspection result data are referred to as manufacturing data.

The display control unit 530 controls display of the measurement data and the manufacturing data on the display unit 400. In the present embodiment, the display control unit 530, by executing the injection molding management program, reads the measurement data and the manufacturing data, generates a management screen, and displays the management screen on the display unit 400. The display control unit 530 displays on the display unit 400 a statistical diagram of the measurement data on a predetermined period basis and the manufacturing data in the period of the statistical diagram in association with the statistical diagram.

Figure 2:
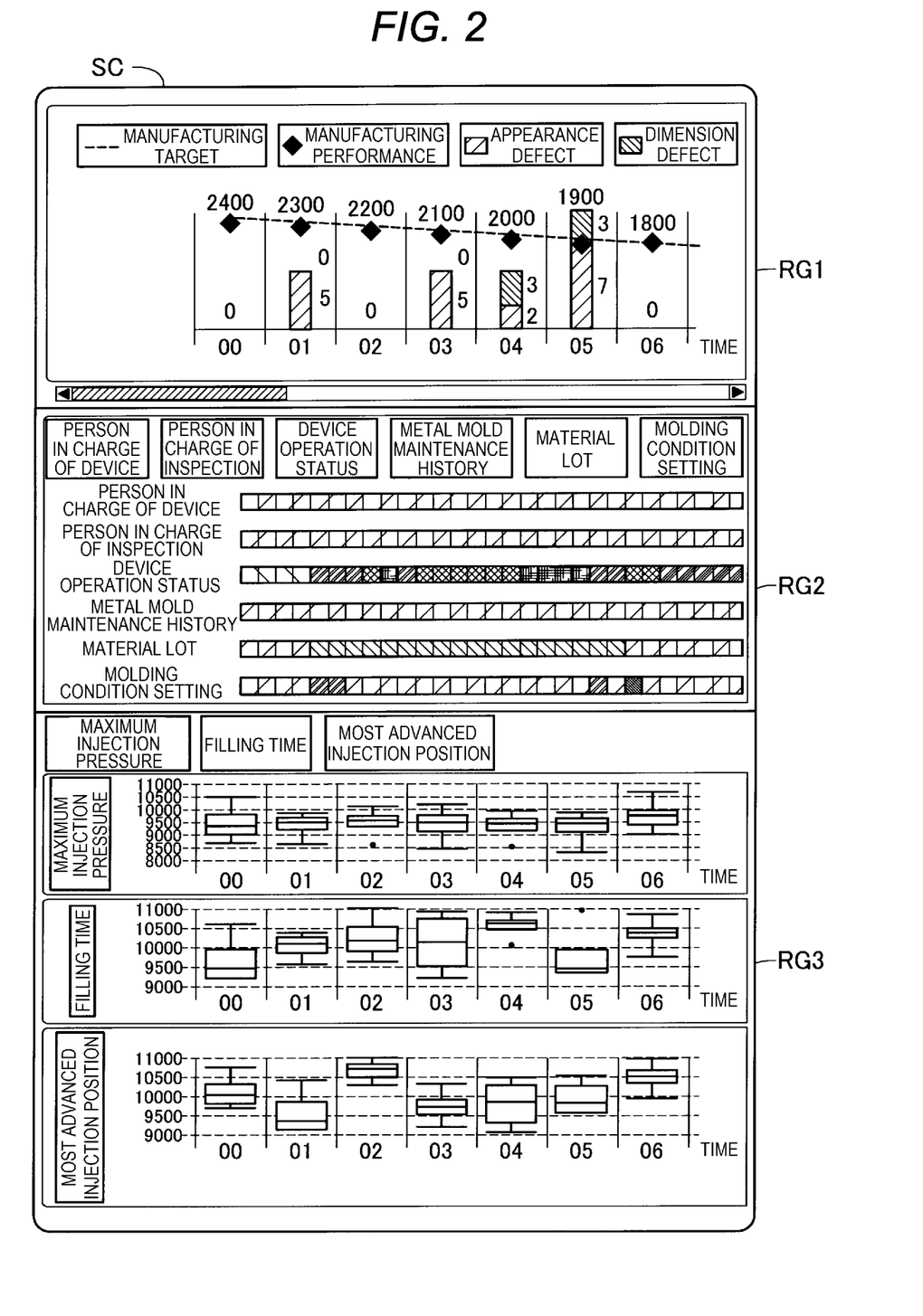
FIG. 2 is a diagram showing an example of a management screen.

FIG. 2 is a diagram showing an example of a management screen SC displayed on the display unit 400. In the present embodiment, the management screen SC includes a manufacturing performance display region RG1, a change history display region RG2, and a measurement data display region RG3 in this order from the top. In each of the regions RG1 to RG3, a graph in which the horizontal axis is a time axis is shown. Each graph has a common time axis.

In the manufacturing performance display region RG1, information on a target number of to-be-manufactured molded products input in advance to the management device 500, information on a performance number of conforming products among manufactured molded products, and information on a performance number of nonconforming products among the manufactured molded products are shown. In the present embodiment, in the manufacturing performance display region RG1, transition of a target number for the number of remaining to-be-manufactured products per hour is shown by a line graph. The target number for the number of the remaining to-be-manufactured products is a value acquired by subtracting, from the total number of molded products scheduled in one production lot, the number of molded products scheduled to be produced in a period from the start of production to a predetermined time point. In this line graph, the transition of the performance number of the remaining to-be-manufactured products per hour is indicated by rhombic marks. The performance number of the remaining to-be-manufactured products is a value acquired by subtracting, from the total number of molded products scheduled in one production lot, the number of molded products produced in a period from the start of production to a predetermined time point.

In the present embodiment, various graphs showing information for 24 hours from 0:00 a.m. of a production start day to 0:00 a.m. of the next day are generated by the display control unit 530 and displayed on the display unit 400. FIG. 2 shows a portion of the various graphs in which information from 0:00 a.m. to 6:00 a.m. is shown. By operating a slider provided at a lower end portion of the manufacturing performance display region RG1, it is possible to browse a portion of the various graphs in which information from 7:00 a.m. onward is shown. Although the various graphs showing information for 24 hours from 0:00 a.m. on the production start day to 0:00 a.m. on the next day are displayed on the display unit 400, a length of the period shown in the various graphs may be longer or shorter than 24 hours. For example, when the start of the production is 9:00 a.m. and the end of the production is 11:00 a.m. of the next day, various graphs showing information for 36 hours from 0:00 a.m. of the production start day to 0:00 p.m. of the next day may be displayed on the display unit 400.

In the manufacturing performance display region RG1, a bar graph representing transition of the number of nonconforming products per hour is shown together with the line graph described above. A lower portion of the bar graph represents the number of nonconforming products due to the appearance nonconformance and an upper portion of the bar graph represents the number of nonconforming products due to the dimension nonconformance. In the example shown in FIG. 2, it is shown that the number of nonconforming products at 0:00 a.m. is zero. It is shown that the number of nonconforming products due to the appearance nonconformance at 1:00 a.m. is five. At 4:00 a.m., it is shown that the number of nonconforming products due to the appearance nonconformance is two and the number of nonconforming products due to the dimension nonconformance is three.

In the change history display region RG2, a change history of the manufacturing conditions or the inspection conditions is shown. In the present embodiment, the change history display region RG2 includes columns for displaying change histories of a "person in charge of device", a "person in charge of inspection", a "device operation status", a "metal mold maintenance history", a "material lot", and a "molding condition setting" among the manufacturing conditions and the inspection conditions. In each column, a change history of each condition is displayed in a form of a band graph. The change history of the manufacturing conditions or the inspection conditions is shown by switching the type of hatching applied to a band with a time point at which the manufacturing conditions or the inspection conditions are changed as a boundary. Instead of hatching, the change history of the manufacturing conditions or the inspection conditions may be represented by switching a color of the band.

The column of the "person in charge of device" shows a change history of a person who is in charge of operation of the injection molding machine 100. The column of the "person in charge of inspection" shows a change history of a person who is in charge of inspection by the inspection device 300. The column of the "device operation status" shows a change history of an operation status of the injection molding machine 100. The operation status means a status during normal operation, abnormal stop, or the like. The column of the "metal mold maintenance history" shows a history in which maintenance of the metal mold is executed, such as a cleaning work of removing dirt adhering to the metal mold, or a work of replenishing grease to a driving portion in a metal mold such as an ejector pin. The column of the "material lot" shows a change history of the material lot used for molding a molded product. The column of the "molding condition setting" shows a change history of a molding condition of the injection molding machine 100.

In the measurement data display region RG3, measurement data is shown. In the present embodiment, columns for displaying a "maximum injection pressure", "filling time", and a "most advanced injection position" in the measurement data are provided. The maximum injection pressure means a maximum value of injection pressure in one shot. The filling time means time during which a plasticized material in one shot is filled into a molding die. The most advanced injection position means a position where a tip portion of a plunger of an injection device is most advanced in order to inject the plasticized material in one shot into the molding die.

In the measurement data display region RG3, a box-and-whisker plot of the measurement data per hour is shown. The display control unit 530 reads the measurement data stored in the measurement data storage unit 510, and divides the measurement data into measurement data per hour by using the information on the measurement time point included in the measurement data. The display control unit 530 organizes the measurement data per hour in ascending order of the measurement value, and determines a maximum value and a minimum value of the measurement data per hour.

The display control unit 530 determines a second quartile of the measurement data per hour, in other words, a median value of the measurement data per hour. When the number of pieces of the measurement data per hour is an odd number, the display control unit 530 determines a measurement value arranged at a center when the measurement data per hour is arranged in ascending order as the median value of the measurement data per hour. When the number of pieces of the measurement data per hour is an even number, the display control unit 530 determines an average value of two measurement values arranged at a position closest to the center when the measurement data per hour is arranged in ascending order as the median value of measurement data per hour.

The display control unit 530 sorts the measurement data per hour into lower data having a value smaller than the median value and upper data having a value larger than the median value, and determines a first quartile number and a third quartile number of the measurement data per hour.

When the number of pieces of the lower data is an odd number, the display control unit 530 determines a measurement value arranged at a center when the lower data is arranged in ascending order as the first quartile number of the measurement data. When the number of pieces of the lower data is an even number, the display control unit 530 determines an average value of two measurement values arranged at a position closest to the center when the lower data is arranged in ascending order as the first quartile number of the measurement data.

When the number of pieces of the upper data is an odd number, the display control unit 530 determines a measurement value arranged at a center when the upper data is arranged in ascending order as the third quartile number of the measurement data. When the number of pieces of the upper data is an even number, the display control unit 530 determines an average value of two measurement values arranged at a position closest to the center when the upper data is arranged in ascending order as the third quartile number of the measurement data.

The display control unit 530 generates a rectangular box having the first quartile number as a lower end and the third quartile number as an upper end. The display control unit 530 represents the median value in the box by a horizontal line. The display control unit 530 represents the maximum value and the minimum value of the measurement data by horizontal lines. The display control unit 530 connects the lower end of the box and the horizontal line representing the minimum value by a vertical line. The upper end of the box and the horizontal line representing the maximum value are connected by a vertical line. A rectangular portion is referred to as the box. The horizontal line provided on an upper side or a lower side of the box and the vertical line connecting the horizontal line and the box are referred to as a whisker. A vertical length of the box and a vertical length of the whisker represent variations in the measurement data.

In the present embodiment, when an outlier of the measurement data per hour is detected, the display control unit 530 displays the outlier on the display unit 400 in a display format different from the maximum value or the minimum value. For example, the display control unit 530 uses a quartile range (IQR) that is a range of the first quartile number or more and the third quartile number or less to detect a measurement value larger than the upper end of the whisker and a measurement value smaller than the lower end of the whisker as outliers, with a minimum value among measurement values larger than the first quartile number−1.5×IQR as the lower end of the whisker and a maximum value among measurement values smaller than the third quartile number+1.5×IQR as the upper end of the whisker. In the present embodiment, when an outlier is detected, the display control unit 530 displays the outlier with dots instead of a whisker. The display control unit 530 may detect a value exceeding a predetermined upper limit value and a value below a predetermined lower limit value as outliers.

Figure 3:
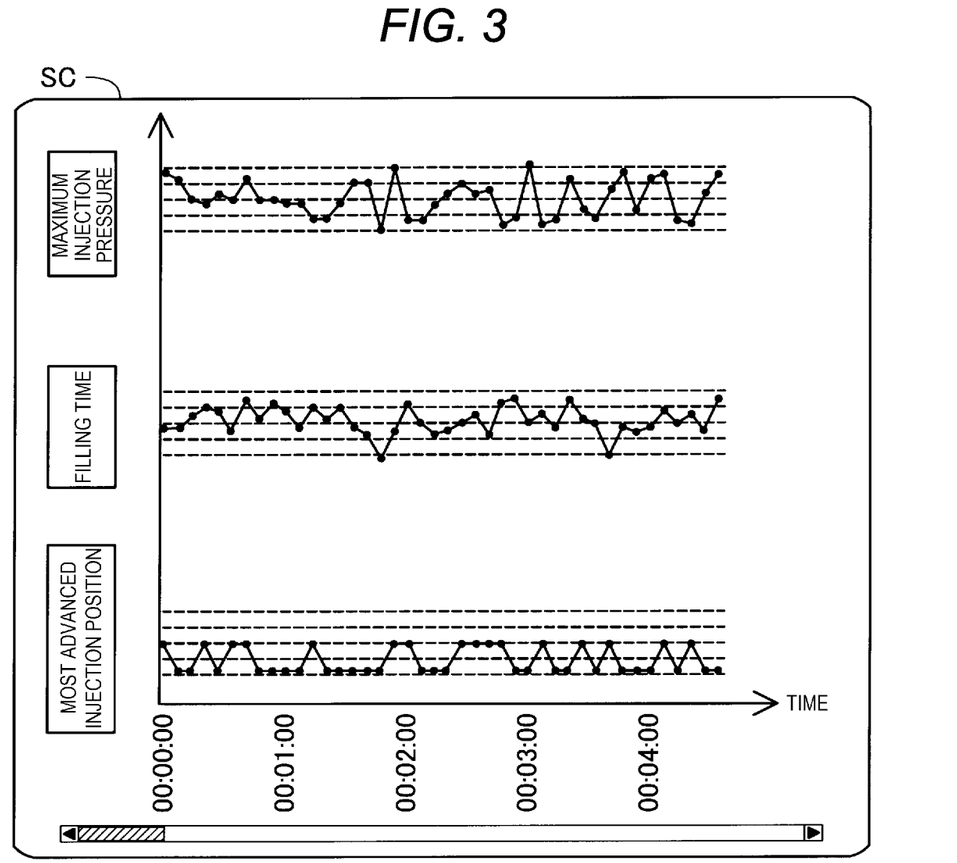
FIG. 3 is a diagram showing an example of a line graph of measurement data.

FIG. 3 is a diagram showing a line graph of measurement data. For example, when a predetermined operation such as clicking a box-and-whisker plot is executed to drill down the box-and-whisker plot shown in FIG. 2, the display control unit 530 switches from a first display mode in which the measurement data is represented by the box-and-whisker plot to a second display mode in which the measurement data is represented by the line graph. In the second display mode, with the horizontal axis of the line graph as the time axis, transition of a maximum injection pressure, filling time, and a most advanced injection position per shot are shown in the line graph. When the predetermined operation is executed in the second display mode, the display control unit 530 switches from the second display mode to the first display mode.

In the example shown in FIG. 2, referring to the manufacturing performance display region RG1, for example, it can be known that there is a nonconforming product due to dimension nonconformance at 4:00 a.m. By referring to the measurement data display region RG3, it can be known that the filling time at 4:00 a.m. is long. On the other hand, the molding conditions are changed so that the filling time is shortened at 5:00 a.m. However, referring to the manufacturing performance display region RG1, it can be known that the number of nonconforming products is increased at 5:00 a.m. as compared to 4:00 a.m. Referring to the measurement data display region RG3, it can be known that the filling time is too short at 5:00 a.m. On the other hand, the material lot is changed at 5:00 a.m., and the molding conditions are changed so that the filling time is shortened. Referring to the manufacturing performance display region RG1, it can be known that the number of nonconforming products is zero at 6:00 a.m.

According to the injection molding machine management system 10 of the present embodiment described above, the display control unit 530 displays on the display unit 400 the various graphs in which information on manufacturing of a molded product is shown and the box-and-whisker plot of the measurement data with the time axes aligned. Therefore, even if the measurement data has a large variation in the measurement value, it is possible to easily analyze a correlation between the measurement data and the information on the manufacturing of the molded product.

Further, in the present embodiment, the display unit 400 displays a graph showing a relationship between a manufacturing target number of molded products and a manufacturing performance number, a graph showing the number of nonconforming products, and a box-and-whisker plot of measurement data, and thus it is possible to easily analyze correlations among the number of nonconforming products, the change history of the molding conditions, and the measurement data.

Further, in the present embodiment, since the display unit 400 displays the graph showing the change history of the molding conditions or the like and the box-and-whisker plot of the measurement data, it is possible to easily analyze the correlation between the change history of the molding conditions and the measurement data.

In the present embodiment, when there is an outlier in the measurement data, the outlier is displayed in a display format different from that of the maximum value or the minimum value of the measurement data. Therefore, since the outlier can be easily identified, the measurement data can be easily analyzed.

Further, in the present embodiment, when a predetermined operation is performed, the display control unit 530 switches between the first display mode in which the measurement data is displayed in the box-and-whisker plot and the second display mode in which the measurement data is displayed in the line graph. Therefore, the measurement data can be analyzed in a polygonal manner using both the box-and-whisker plot and the line graph.

Further, in the present embodiment, the display unit 400 on which the management screen SC is displayed is provided in the mobile terminal. Therefore, the operator can confirm the management screen SC at various places using a mobile terminal at hand. Further, since the display unit 400 is relatively small in the mobile terminal, when an enormous amount of the measurement data is displayed as a line graph, it may be difficult to grasp the measurement data. In the present embodiment, the measurement data is displayed using the box-and-whisker plot instead of the line graph, and therefore, the measurement data can be easily grasped even on a small screen.

B. Other Embodiments (B1) In the injection molding machine management system 10 of the above-described embodiment, the management device 500 may be communicable with a production management system that comprehensively manages the entire manufacturing process via a network or the like, and may transmit data of the management screen SC to the production management system. In this case, the production management system can acquire a ratio of the number of nonconforming products to the number of conforming products, and thus the production management system can make a production plan in consideration of the ratio of the number of nonconforming products to the number of conforming products. Further, the management device 500 may be communicable with, via a network or the like, a material procurement system that orders a material of a molded product, and may transmit the data of the management screen SC to the material procurement system. The material procurement system may additionally order the material of the molded product, for example, when the number of nonconforming products exceeds a predetermined number. In this case, it is possible to prevent the manufacturing of the molded product from being stopped due to the shortage of the material.

(B2) In the injection molding machine management system 10 of the above-described embodiment, the change history display region RG2 is provided in the management screen SC generated by the display control unit 530. On the other hand, the change history display region RG2 may not be provided in the management screen SC.

(B3) In the injection molding machine management system 10 of the above-described embodiment, the display control unit 530 displays the box-and-whisker plot of the measurement data in the measurement data display region RG3 of the management screen SC. On the other hand, the display control unit 530 may display a graph representing a normal distribution, instead of the box-and-whisker plot of the measurement data, in the measurement data display region RG3.

(B4) In the injection molding machine management system 10 of the above-described embodiment, the display control unit 530 displays the outlier of the measurement data on the box-and-whisker plot of the measurement data. On the other hand, the display control unit 530 may not display the outlier of the measurement data on the box-and-whisker plot.

(B5) In the injection molding machine management system 10 of the above-described embodiment, when a predetermined operation is performed, the display control unit 530 switches between the first display mode in which the measurement data is displayed in the box-and-whisker plot and the second display mode in which the measurement data is displayed in the line graph. On the other hand, the display control unit 530 may not display the measurement data as the line graph.

C. Other Embodiments

The present disclosure is not limited to the embodiments described above, and can be implemented in various forms without departing from the scope of the present disclosure. For example, the present disclosure can be implemented in the following aspects. In order to solve a part of or all of problems of the present disclosure, or to achieve a part of or all of effects of the present disclosure, technical features in the above-described embodiments corresponding to technical features in the following aspects can be replaced or combined as appropriate. The technical features can be deleted as appropriate unless described as necessary in the present specification.

(1) According to a first aspect of the present disclosure, an injection molding machine management system is provided. The injection molding machine management system includes: a measurement data storage unit that chronologically stores measurement data representing a measurement value measured by an injection molding machine; a manufacturing data storage unit that chronologically stores manufacturing data representing information on manufacturing of a molded product by the injection molding machine; and a control unit that displays on a display unit a statistical diagram of the measurement data on a predetermined period basis and the manufacturing data in the period of the statistical diagram in association with the statistical diagram.

According to the injection molding machine management system of this aspect, since the control unit displays on the display unit the statistical diagram of the measurement data on a predetermined period basis and the manufacturing data in the period of the statistical diagram in association with the statistical diagram, it is possible to easily analyze a correlation between the measurement data and the manufacturing data.

(2) In the injection molding machine management system according to the above aspect, the manufacturing data may include information on a quantity of the molded product satisfying a predetermined quality standard or information on a quantity of the molded product not satisfying the quality standard.

According to the injection molding machine management system of this aspect, it is possible to analyze a correlation between the measurement data and the quality of the molded product.

(3) In the injection molding machine management system according to the above aspect, the manufacturing data may include information on a change history of a molding condition of the injection molding machine.

According to the injection molding machine management system of this aspect, it is possible to analyze a correlation between the measurement data and the change history of the molding condition.

(4) In the injection molding machine management system according to the above aspect, the statistical diagram may be a box-and-whisker plot.

According to the injection molding machine management system of this aspect, a distribution of the measurement data can be easily visually grasped.

(5) In the injection molding machine management system according to the above aspect, in the box-and-whisker plot, an outlier of the measurement data may be displayed in a display format different from a display format of a maximum value or a minimum value of the measurement data.

According to the injection molding machine management system of this aspect, the outlier of the measurement data can be easily visually grasped.

(6) In the injection molding machine management system according to the above aspect, the control unit may switch, when a predetermined operation is performed, between a first display mode in which the measurement data is displayed in the box-and-whisker plot and a second display mode in which the measurement data is displayed in a line graph.

According to the injection molding machine management system of this aspect, since it is possible to switch between the first display mode in which the measurement data is displayed in the box-and-whisker plot and the second display mode in which the measurement data is displayed in the line graph, it is possible to analyze the measurement data in a polygonal manner using the box-and-whisker plot and the line graph.

(7) In the injection molding machine management system according to the above aspect, the display unit may be provided in a mobile terminal.

According to the injection molding machine management system of this aspect, since the correlation between the measurement data and the manufacturing data is displayed on the display unit provided in the mobile terminal, the correlation between the measurement data and the manufacturing data can be confirmed at various places.

(8) According to a second aspect of the present disclosure, a non-transitory computer-readable storage medium storing a computer program is provided. The computer program causes a computer to: chronologically store, on a storage unit, measurement data representing a measurement value measured by an injection molding machine; chronologically store, on a storage unit, manufacturing data representing information on manufacturing of a molded product by the injection molding machine; and display, on a display unit, a statistical diagram of the measurement data on a predetermined period basis and the manufacturing data in the period of the statistical diagram in association with the statistical diagram.

According to the non-transitory computer-readable storage medium storing a computer program of this aspect, since the control unit can display on the display unit the statistical diagram of the measurement data on a predetermined period basis and the manufacturing data in the period of the statistical diagram in association with the statistical diagram, it is possible to easily analyze a correlation between the measurement data and the manufacturing data.

The present disclosure can also be implemented in various forms other than the injection molding machine management system. For example, the present disclosure can be implemented in the form of a computer program, or an injection molding machine management method.

What is claimed is:

1. An injection molding machine management system comprising:
    a measurement data storage unit that chronologically stores measurement data representing a measurement value measured by an injection molding machine;
    a manufacturing data storage unit that chronologically stores manufacturing data representing information on manufacturing of a molded product by the injection molding machine; and
    a control unit that displays:
        a first statistical diagram of manufacturing performance by a predetermined period basis at a first region of a display screen of a display, the manufacturing performance including a target number of the molded product, an actual manufactured number of the molded product, a number of appearance defects of the molded product, and a number of dimension defects of the molded product;
        a second statistical diagram of a change history of a manufacturing condition at a second region of the display screen of the display, the second region being below the first region; and
        a third statistical diagram of the measurement data by the predetermined period basis at a third region of the display screen of the display, the third region being below the second region,
    wherein the third statistical diagram includes maximum injection pressures, filling times, and most advanced injection positions relating to the injection molding machine,
    each of the maximum injection pressures, the filling times, and the most advanced injection positions is shown as a box-and-whisker plot per hour having the same horizontal axis of time,
    the maximum injection pressures are configured with a maximum value of an injection pressure in one shot,
    the filling times are configured with a period of time during which a plasticized material in one shot is filled into a molding die,
    the most advanced injection positions are configured with a position where a tip of a plunger of the injection molding machine is most advanced in order to inject the plasticized material in one shot into the molding die, and
    when an outlier of the measurement data relating to each of the maximum injection pressures, the filling times, and the most advanced injection positions is detected, the control unit displays a dot representing the outlier on the third statistical diagram in the display.

2. The injection molding machine management system according to claim 1, wherein
    the manufacturing data includes information on a quantity of the molded product satisfying a predetermined quality standard or information on a quantity of the molded product not satisfying the quality standard.

3. The injection molding machine management system according to claim 1, wherein
    the manufacturing data includes information on a change history of a molding condition of the injection molding machine.

4. The injection molding machine management system according to claim 1, wherein
    the dot representing the outlier of the measurement data is displayed at an outside of a range from a maximum value to a minimum value in the box-and-whisker plot of the measurement data.

5. The injection molding machine management system according to claim 1, wherein
    the control unit switches, when a predetermined operation is performed, between a first display mode in which the measurement data is displayed in the box-and-whisker plot and a second display mode in which the measurement data is displayed in a line graph.

6. The injection molding machine management system according to claim 1, wherein
    the display is provided in a mobile terminal.

7. A non-transitory computer-readable storage medium storing a computer program for causing a computer to execute a process by a processor so as to perform the steps of:
- chronologically storing, on a storage unit, measurement data representing a measurement value measured by an injection molding machine;
- chronologically storing, on the storage unit, manufacturing data representing information on manufacturing of a molded product by the injection molding machine;
- displaying a first statistical diagram of manufacturing performance by a predetermined period basis at a first region of a display screen of a display, the manufacturing performance including a target number of the molded product, an actual manufactured number of the molded product, a number of appearance defects of the molded product, and a number of dimension defects of the molded product;
- displaying a second statistical diagram of a change history of a manufacturing condition at a second region of the display screen of the display, the second region being below the first region;
- displaying a third statistical diagram of the measurement data by the predetermined period basis at a third region of the display screen of the display, the third region being below the second region,
- wherein the third statistical diagram includes maximum injection pressures, filling times, and most advanced injection positions relating to the injection molding machine,
- each of the maximum injection pressures, the filling times, and the most advanced injection positions is shown as a box-and-whisker plot per hour having the same horizontal axis of time,
- the maximum injection pressures are configured with a maximum value of an injection pressure in one shot,
- the filling times are configured with a period of time during which a plasticized material in one shot is filled into a molding die,
- the most advanced injection positions are configured with a position where a tip of a plunger of the injection molding machine is most advanced in order to inject the plasticized material in one shot into the molding die, and
- when an outlier of the measurement data relating to each of the maximum injection pressures, the filling times, and the most advanced injection positions is detected, the control unit displays a dot representing the outlier on the third statistical diagram in the display.

* * * * *